W. N. R. COPLEY.
RAIL JOINT.
APPLICATION FILED DEC. 19, 1910.

1,004,373. Patented Sept. 26, 1911.
2 SHEETS—SHEET 1.

Witnesses
Robert M. Sutphen
Ross J. Woodward

Inventor
WILLIAM N. R. COPLEY
By E. E. Vrooman
his Attorney.

W. N. R. COPLEY.
RAIL JOINT.
APPLICATION FILED DEC. 19, 1910.

1,004,373.

Patented Sept. 26, 1911.

Witnesses
Robert M. Sutphen
Ross J. Woodward

Inventor
William N. R. Copley
By E. E. Vrooman,
his Attorney.

UNITED STATES PATENT OFFICE.

WILLIAM N. R. COPLEY, OF KITTANNING, PENNSYLVANIA.

RAIL-JOINT.

1,004,373.  Specification of Letters Patent.  Patented Sept. 26, 1911.

Application filed December 19, 1910. Serial No. 598,034.

*To all whom it may concern:*

Be it known that I, WILLIAM N. R. COPLEY, a citizen of the United States, residing at Kittanning, in the county of Armstrong and State of Pennsylvania, have invented certain new and useful Improvements in Rail-Joints, of which the following is a specification, reference being had therein to the accompanying drawing.

This invention relates to rail joints, and the principal object of the same is to provide a rail joint which will be inexpensive to manufacture, and which will securely hold the two rail sections together.

A second object of the invention is to provide a means for holding the bottoms of the rails upon a higher plane than the bottoms of the fish plates, so that lugs formed upon the side plates will be securely held within notches formed in the rails.

This invention is illustrated in the accompanying drawings, wherein:—

Figure 1:
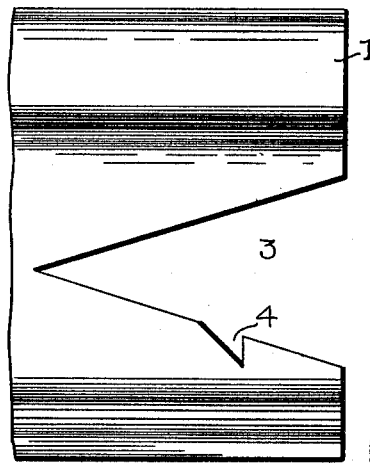
Figure 2:
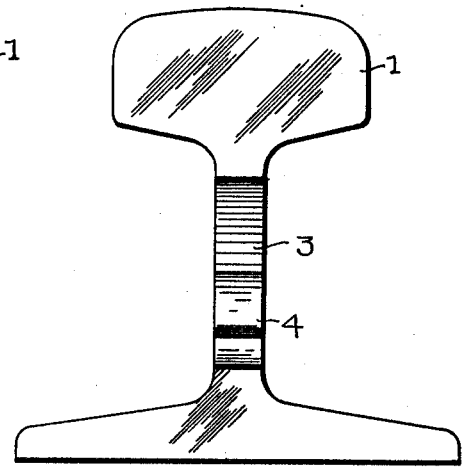
Figure 3:
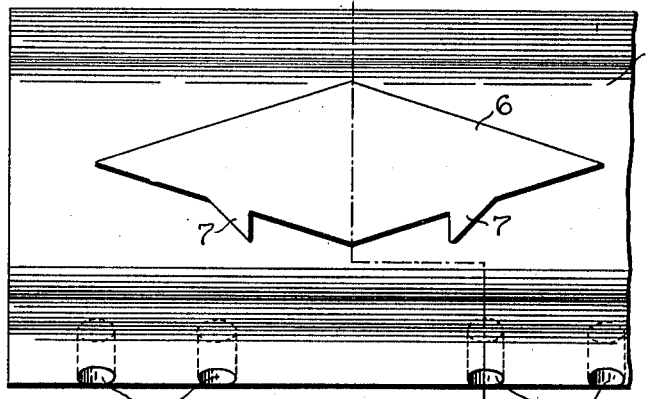
Figure 4:
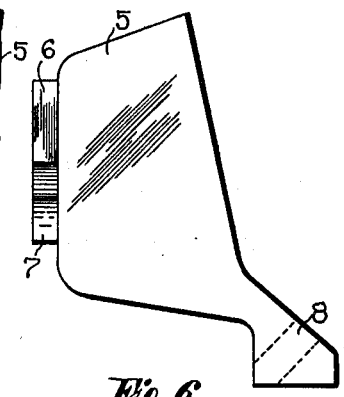
Figure 5:
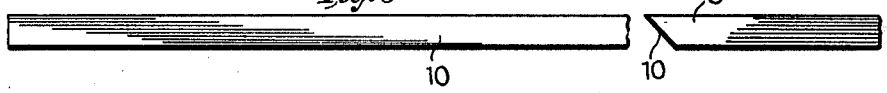
Figure 6:
Figure 7:
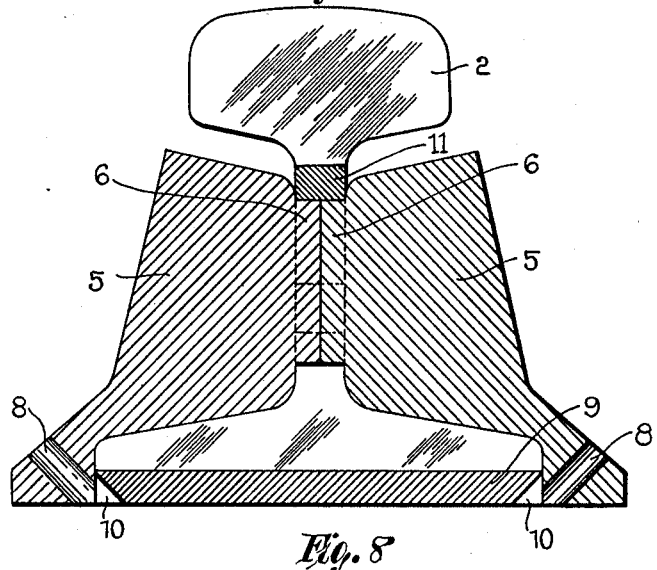
Figure 8:
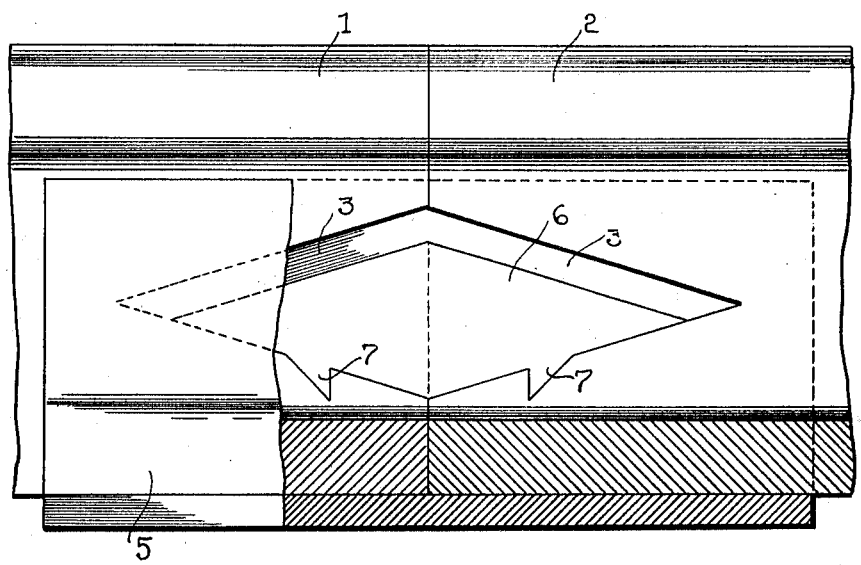

Figure 1 is a view in side elevation of one end of a rail constructed in accordance with my invention. Fig. 2 is an end view of Fig. 1. Fig. 3 is an inner side view of the improved fish plate. Fig. 4 is an end view of the fish plate. Fig. 5 is a longitudinal edge view of the base plate. Fig. 6 is a transverse edge view of the end of the base plate. Fig. 7 is a transverse sectional view through the fish plates along a line A—A in Fig. 3 and shows the plates connected with a rail. Fig. 8 is a view showing how the fish plates would appear when in place, one of the fish plates being broken away.

Referring to the accompanying drawings by numerals, it will be seen that the device is intended to join the abutting ends of a pair of rails 1 and 2, each of which is provided in its end portion with a V-shaped recess 3, and with one or more notches 4 in the lower wall of the recess 3. These notches 4 are formed tooth shaped and are inclined toward the end of the rail so that when the securing plate is placed in position the rail cannot slip away. A fish plate 5 is provided with a thickened upper portion which fits the contour of the side of the rail and is of such length that they will extend along the sides of both rails when the rails are placed against each other. Each of the plates is provided on its inner surface with a centrally located diamond shaped plate 6 from the bottom edge of which there extend the teeth 7, which are of the same shape as the notches 4 and correspond in number and position to the notches. The diamond shaped plates are of a smaller size than the recesses 3 so that when the recesses are brought into register and form a diamond shaped opening, the opening will be larger than the general dimensions of the plates, so as to permit the teeth to enter the notches more easily than would be the case if the plate were of the same size as the recess. The fish plates are provided near their lower edges with a number of spike openings 8 which slope inwardly, so that when the spikes are driven in, the plates 6 are held close together, and that the base plate 9 which has inwardly beveled sides 10 will be braced against any transverse movement, and also prevents the plate being driven into the tie, by the weight of the train passing over the rail.

When it is desired to connect a pair of rails by this method, the plate 9 is placed upon the tie, and the ends of the rails brought into contact so that there is formed a diamond shaped opening as shown in Fig. 8. The fish plates are placed against the sides of the rail and have the side plates 6 enter the recesses 3. By having these plates made smaller than the recesses the plates can be easily inserted, and it is not necessary to have them made an exact size. After the fish plates are in place as shown in Fig. 7 spikes are driven through the openings 8, and preferably have their inner ends contacting with the beveled sides 10 of the base plate, and extending beneath the plate. When the spikes are driven tightly into place, the teeth 7 of the side plates 6 are held rigidly in the notches 4 and it is impossible for the rails to become loose as the teeth point toward the ends of the rails, and the rails are thus securely held in place.

It is to be noted that the space above the diamond shaped projections 6 may be filled with short strips 11 as indicated in Fig. 7 if the same is found desirable but that these strips may also be left off if not found best for the purpose.

It is obvious that other minor changes may be made in the form and construction of this invention without departing from the material principles thereof. It is not therefore desired to confine the invention to the exact form herein shown and described but it is wished to include all such as come within the scope of the appended claim.

What I claim is:—

In a rail joint a pair of rails provided with end recesses, and with notches inclined toward the ends of said rails, a base plate adapted to hold said rails above a tie, said base plate having inwardly beveled edges, and a pair of fish plates provided with side plates and teeth fitting into said recesses and notches, said fish plates being provided near their lower edges with inwardly inclined spike openings to permit the passage of spikes to hold said fish plates in place and to brace said base plate.

In testimony whereof I hereunto affix my signature in presence of two witnesses.

WILLIAM N. R. COPLEY.

Witnesses:
E. R. LEE, Jr.,
W. J. LOUDEN.

Copies of this patent may be obtained for five cents each, by addressing the "Commissioner of Patents, Washington, D. C."